(12) United States Patent  
Chatterjee et al.

(10) Patent No.: US 12,223,098 B2  
(45) Date of Patent: *Feb. 11, 2025

(54) SYSTEMS AND METHODS FOR DYNAMIC CONTROL OF A SECURE MODE OF OPERATION IN A PROCESSOR

(71) Applicant: International Business Machines Corporation, Armonk, NY (US)

(72) Inventors: Debapriya Chatterjee, Austin, TX (US); Christian Zoellin, Bad Urach (DE); Bradly George Frey, Austin, TX (US); Brian W. Thompto, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/376,247

(22) Filed: Oct. 3, 2023

(65) Prior Publication Data

US 2024/0028772 A1 Jan. 25, 2024

Related U.S. Application Data

(63) Continuation of application No. 17/124,007, filed on Dec. 16, 2020, now Pat. No. 11,797,713.

(51) Int. Cl.
*G06F 21/74* (2013.01)
*G06F 9/38* (2018.01)

(52) U.S. Cl.
CPC ............ *G06F 21/74* (2013.01); *G06F 9/3818* (2013.01)

(58) Field of Classification Search
CPC ............................... G06F 21/74; G06F 9/3818
See application file for complete search history.

(56) References Cited

U.S. PATENT DOCUMENTS

| 5,721,916 A | 2/1998 | Pardikar |
|---|---|---|
| 7,043,616 B1 | 5/2006 | McGrath |

(Continued)

FOREIGN PATENT DOCUMENTS

| CN | 104301289 A | 1/2015 |
|---|---|---|
| CN | 104618584 A | 5/2015 |
| EP | 2619670 B1 | 4/2016 |

OTHER PUBLICATIONS

QUALCOMM. "Pointer Authentication on ARMv8.3: Design and Analysis of the New Software Security Instructions" whitepaper from Qualcomm https://www.qualcomm.com/media/documents/files/whitepaper-pointer-authentication-on-armv8-3.pdf. Jan. 2017. p 1-12.

(Continued)

*Primary Examiner* — Gary Collins
(74) *Attorney, Agent, or Firm* — Scully, Scott, Murphy & Presser, P.C.

(57) ABSTRACT

A computer system, processor, and/or method for changing the mode of operation of a computer without rebooting includes: a processor having a configuration register, the configuration register having a privilege entry (PRVS) register field for each of one or more privilege levels, each PRVS register field for each privilege level having one or more control aspect entries; and an enforce below (ENFB) register field, each ENFB register field for each privilege level having one or more control aspect entries, the PRVS register field control aspects being equal in number to and corresponding to the ENRB register field control aspects. The PRVS register fields and the ENFB register fields are used to change the processor from a secure mode to a performance mode while running software applications.

20 Claims, 5 Drawing Sheets

(56) References Cited

U.S. PATENT DOCUMENTS

| | | | |
|---|---|---|---|
| 7,401,358 | B1 | 7/2008 | Christie et al. |
| 7,752,459 | B2 | 7/2010 | Cowan et al. |
| 8,571,993 | B2 | 10/2013 | Kocher et al. |
| 9,514,305 | B2 | 12/2016 | Acar et al. |
| 9,891,918 | B2 | 2/2018 | Hooker et al. |
| 9,898,351 | B2 | 2/2018 | Chaffin et al. |
| 10,317,976 | B2 | 6/2019 | Schluessler et al. |
| 10,333,965 | B2 | 6/2019 | Gathala et al. |
| 11,797,713 | B2 * | 10/2023 | Chatterjee ............. G06F 9/3818 |
| 2003/0226022 | A1 | 12/2003 | Schmidt et al. |
| 2009/0204823 | A1 | 2/2009 | Giordano |
| 2020/0082066 | A1 | 3/2020 | Semeria et al. |
| 2020/0082070 | A1 | 3/2020 | Semeria et al. |
| 2020/0125501 | A1 | 4/2020 | Durham et al. |

OTHER PUBLICATIONS

Safenet. "Hardware and Software Authentication:Choosing the Right Approach Decision Guide." Google.com, 2018, 7 pages.

Anonymous. "A Method of Verifying the Intended Recipient of Any Communication for Improved Security." IP.com; IPCOM000252449D. Jan. 12, 2018. 4 pages.

Anonymous. "Methodology and Procedure for Secure Granular Authorization and Audit Implementation in Distributed Enterprise Computing Environment." IP.com; IPCOM000237293D. Jun. 11, 2014. 18 pages.

Anonymous. "A Practical Code Signing Server for the Enterprise." IP.com; IPCOM000236621D. May 6, 2014. 11 pages.

Asokan, N. "Hardware-Assisted Run-Time Protection on Balancing Security and Deployability." Aalto University. 2017. 38 pages.

Liljestrand et al. "PAC it up: Towards Pointer Integrity using ARM Pointer Authentication." In 28th USENIX Security Symposium (USENIX Security 19) https://www.usenix.org/conference/usenixsecurity19/presentation/liljestrand. Aug. 14, 2019-Aug. 16, 2019. pp. 177-194.

Mashtizadeh et al. "CCFI: Cryptographically Enforced Control Flow Integrity." In Proceedings of the 22nd ACM SIGSAC Conference on Computer and Communications Security (CCS '15). Association for Computing Machinery, New York, NY, USA, DOI:https://doi.org/10.1145/2810103.2813676, 2015. 941-951.

Khalifa et al. "Memory Controller Architectures: A Comparative Study." Google, Research Gate. Dec. 2013. 7 pages.

Nuclei System Technology. "Dual-Mode Configurable RISC-V Processor IP." Google, 2017. 21 pages.

Anonymous. "Power-Saving Mode Control with Dynamically-Controlled Access." IP.com; IPCOM000239255D. Oct. 23, 2014. 5 pages.

Anonymous. "Dynamic, Adaptive Resolution for Performance Instrumentation." IP.com; IPCOM000237621D. Jun. 27, 2014. 5 pages.

Anonymous. "System and Method for Dynamic Identification of Refmon Check Necessity." IP.com; PCOM000234759D. Feb. 3, 2014. 4 pages.

International Search Report and Written Opinion dated Mar. 9, 2022, received in a corresponding foreign application, 9 pages.

List of IBM Patents or Patent Applications Treated as Related dated Oct. 3, 2023, 2 pages.

German Patent and Trademark Office, "Office Action," Dec. 5, 2024, 13 Pages, DE Application No. 112021005994.7.

* cited by examiner

SYSTEMS AND METHODS FOR DYNAMIC CONTROL OF A SECURE MODE OF OPERATION IN A PROCESSOR

BACKGROUND

The present invention generally relates to information handling and data processing systems, processors, and memory systems, and more specifically to dynamically controlling one or more secure modes of operations in a processor.

With recent advancements in information technology and the wide use of the Internet to store and process information, more and more demands are placed on the acquisition, processing, storage and dissemination of information by computing systems. Computing systems are being developed to increase the speed at which the computers are able to execute increasingly complex applications for business, personal use, and entertainment. Overall computer system performance is affected by each of the key elements of the computer structure, including the performance/structure of the processors, any memory caches, input/output (I/O) subsystems, efficiency of the memory control functions, the performance of the memory devices and systems, and any associated memory interface elements, and the type and structure of the memory interconnect interfaces.

Modern computer systems typically contain several integrated circuits (ICs), including a processor which may be used to process information in the computer system. The information processed by a processor may include computer instructions that are executed by the processor as well as data, which is manipulated by the processor using the computer instructions. The computer instructions (e.g., applications) and data are typically stored in a main memory in the computer system. The performance of the processor can affect the performance of the information handling system, also referred to as a computing system or data processing system.

Keeping unauthorized users and/or rogue software from accessing information handling and data processing systems is becoming increasingly important and difficult to achieve. In one situation, a user or software application may be authorized to have access to an information handling system, a processor, register files, and/or the memory subsystem, but may not be authorized to have complete access to the complete system, all the register files, or all of the memory subsystem. Accordingly, while the user or software application may be authorized to access portions of the system, the user and/or software application is not authorized to access the entire system, all the register files, and/or all the memory subsystem. In other situations, a user and/or software application is not authorized to access any portion of the computing system, the register files, and/or any portion of the memory subsystem. Protecting systems, register files, and/or memory subsystems from being accessed by an unauthorized user and/or software application can be difficult.

In micro-processor design, micro-architectural performance optimizations can also open certain side-channel security holes in a processor that make the processor and/or computing system more vulnerable to attack. For example, certain performance mechanisms and features in a micro-processor can inherently expose a microprocessor to Spectre-RSB side channel attack. While the performance features can make the processor more vulnerable to attack, under certain trusted execution environments, it might be beneficial to utilize the performance optimization as the associated side channel attack may not pose much of a real threat. In other circumstances and execution environments, the more secure configuration which does not utilize or disables the performance optimization, can be warranted. It would be beneficial if the processor configuration that provides optimized performance or optimized security could be dynamically controlled or switched, preferably in an embodiment by trusted software, so that the processor can make the best use of hardware and features, instead of the performance/security mode being set and fixed at boot time by firmware.

SUMMARY

The summary of the disclosure is given to aid understanding of a computer system, computer architectural structure, processor, their methods of operation, and execution of software applications, including a technique of controlling the security mode of such systems, processors, and their methods of operation, and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the computer system, the architectural structure, processor, register files, their method of operation, and manner of executing software applications to achieve different effects.

Aspects of the present disclosure provide in one or more embodiments a system and/or method of processing data in a processor that includes changing a mode of operation in a processor without rebooting the processor. The system and/or the method in an embodiment includes: initiating a change in configuration in a processor from a performance mode to a secure mode for a control aspect in a privilege level; determining whether the bit for the control aspect in the privilege level is set in a Privilege Entry (PRVS) register field to secure mode; and if the bit for the control aspect in the privilege level in the PRVS register field is not set to secure mode, then setting the bit for the control aspect in the privilege level in the PRVS register field to secure mode, thereby enabling the secure mode in the processor for the control aspect in the privilege level. Preferably, the system and/or method further includes determining whether to enforce secure mode for the control aspect on lower privilege levels; and if it is determined not to enforce secure mode for the control aspect on lower privilege levels then the method of changing to the secure mode for the control aspect in the privilege level is complete. The system and/or method in an embodiment can further include: if it is determined to enforce secure mode for the control aspect on the lower privilege levels, then determining whether the bit for the control aspect in the lower privilege levels is set in an Enforce Below (ENFB) register field to secure mode; and if it is determined that the bit for the control aspect in the lower privilege levels in the ENFB register field is set to secure mode, then the process of changing to the secure mode for the control aspect in the privilege level is complete. The system and/or method in a further embodiment includes: if it is determined that the bit for the control aspect in the lower privilege levels in the ENFB register field is not set to secure mode, then determining whether a policy for the control aspect in the privilege level permits enforcing the secure mode for the control aspect on the lower privilege levels; and if the policy for the control aspect in the privilege level does not permit enforcing the secure mode of the control aspect in the lower privilege levels, then the process of changing to a secure mode for the control aspect in the privilege level is complete. In an aspect, the secure mode or performance mode of the processor for the control aspect in the privilege level is controlled by a software application.

In one or more embodiments, the system and/or method further includes: in response to a trigger to change from a secure mode to a performance mode for the control aspect in the privilege level, checking whether the bit in the SRVS register field for the control aspect in the privilege level is set to the performance mode; in response to the bit in the SRVS register field for the control aspect in the privilege level not being set to the performance mode, setting the bit in the service register field for the control aspect in the privilege level to the performance mode; checking whether the control aspect in the privilege level of the ENFB register field is set to performance mode for all higher privilege levels; and in response to the control aspect in the privilege level of the ENFB register being set to the performance mode for all higher privilege levels, changing the processor to the performance mode for the control aspect in the privilege level. The system and/or method, in an aspect includes in response to the control aspect in the privilege level of the ENFB register not being set to the performance mode for all higher privilege levels, requesting the higher privilege levels to permit the performance mode for the control aspect in the privilege level; and in response to the higher privilege levels not permitting the performance mode for the control aspect in the privilege level, the processor does not enter into the performance mode for the control aspect in the privilege level. Requesting the higher privilege levels to permit the performance mode for the control aspect in the privilege level typically includes: looking up a policy for the higher privilege levels regarding the performance mode for the control aspect on lower privilege levels; checking whether the policy permits the performance mode for the control aspect in the privilege level; and in response to the policy permitting the performance mode for the control aspect in the privilege level, the bit in the ENFB register field for the control aspect in the privilege level is set to the performance mode thereby permitting the processor to enter the performance mode for the control aspect in the privilege level.

In one or more embodiments, a computer system for processing information is disclosed that includes: at least one processor having one or more register files, wherein at least one of the registers is a configuration register, the configuration register having a privilege entry (PRVS) register field for each of one or more privilege levels, each PRVS register field for each privilege level having one or more control aspect entries to hold a bit; and an enforce below (ENFB) register field for one less than each of one or more privilege levels, each ENFB register field for each privilege level having one or more control aspect entries to hold a bit, the PRVS register field control aspects being equal in number to and corresponding to the ENRB register field control aspects. The processor is configured and adapted to initiate a change in configuration in a processor from a performance mode to a secure mode for a control aspect in a privilege level that includes: determining whether the bit for the control aspect in the privilege level is set in a Privilege Entry (PRVS) register field to secure mode; and if the bit for the control aspect in the privilege level in the PRVS register field is not set to secure mode, then setting the bit for the control aspect in the privilege level in the PRVS register field to secure mode, thereby enabling the secure mode in the processor for the control aspect in the privilege level. The processor preferably is further configured and adapted to: determine whether to enforce secure mode for the control aspect on lower privilege levels; and if it is determined to enforce secure mode for the control aspect on the lower privilege levels, then determine whether the bit for the control aspect in the lower privilege levels is set in an Enforce Below (ENFB) register field to secure mode; and if it is determined that the bit for the control aspect in the lower privilege levels in the ENFB register field is set to secure mode, then the process of changing to the secure mode for the control aspect in the privilege level is complete.

In a further aspect, the system includes: in response to a trigger to change from a secure mode to a performance mode of operation for a control aspect in a privilege level, checking whether a bit in a Service Entry (SRVS) register field for the control aspect in the privilege level is set to the performance mode; in response to the bit in the SRVS register field for the control aspect in the privilege level not being set to the performance mode, setting the bit in the service register field for the control aspect in the privilege level to the performance mode; checking whether the control aspect in the privilege level of an Enforce Below (ENFB) register field is set to performance mode for all higher privilege levels; and in response to the control aspect in the privilege level of the ENFB register being set to the performance mode for all higher privilege levels, changing the processor to the performance mode for the control aspect in the privilege level.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

The various aspects, features and embodiments of the information handling system, computer system, computer architectural structure, processor, register files, their method of operation, and manner of executing software applications will be better understood when read in conjunction with the figures provided. Embodiments are provided in the figures for the purpose of illustrating aspects, features and/or various embodiments of the computer system, computer architectural structure, processor, register files, and their method of operation including their manner of executing software applications, but the claims should not be limited to the precise arrangement, structures, assemblies, subassemblies, functional units, mechanisms, features, aspects, embodiments, devices, methods, processes, or techniques shown, and the arrangements, structures, assemblies, subassemblies, functional units, mechanisms, features, aspects, embodiments, devices, methods, processes, and techniques shown may be used singularly or in combination with other arrangements, structures, assemblies, subassemblies, functional units, mechanisms, features, aspects, embodiments, devices, methods, processes, and techniques.

DETAILED DESCRIPTION

The following description is made for illustrating the general principles of the invention and is not meant to limit the inventive concepts claimed herein. In the following detailed description, numerous details are set forth in order to provide an understanding of the information handling system, computer system, computer architectural structure, processor, memory, functional units, register files, memory subsystem, and their method of operation including their manner of executing software applications, however, it will be understood by those skilled in the art that different and numerous embodiments of the computer system, computer architectural structure, processor, functional units, register files, memory subsystem, and their method of operation including their manner of executing software applications may be practiced without those specific details, and the claims and invention should not be limited to the embodiments, assemblies, subassemblies, structures, arrangements, mechanisms, functional units, features, aspects, processes, methods, techniques or details specifically described and shown herein. Further, particular features, functional units, mechanisms, structures, arrangements, embodiments, and aspects described herein can be used in combination with other described features, functional units, mechanisms, structures, arrangements, embodiments, and aspects in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified.

The following discussion omits or only briefly describes conventional features of information processing systems, including processors, microprocessor systems, memory systems, and system architecture, which are apparent to those skilled in the art. It is assumed that those skilled in the art are familiar with the general architecture of computer systems, memory systems, processors, and with register files, including configuration register files. It may be noted that a numbered element is numbered according to the figure in which the element is introduced, and is typically referred to by that number throughout succeeding figures.

Figure 1:
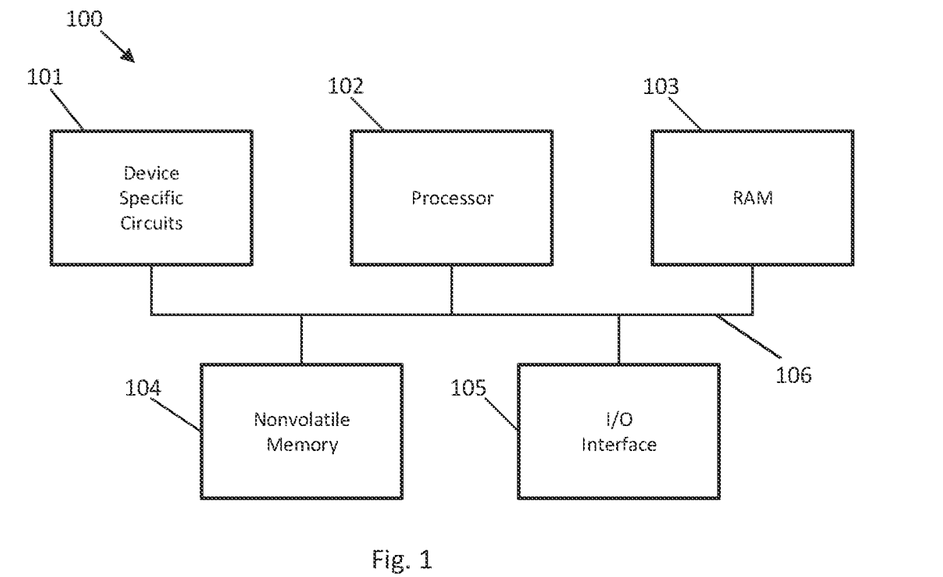
FIG. 1 depicts a general computing or data processing system in accordance with an embodiment of the present disclosure.

A computing or data processing system 100 suitable for use in the present disclosure may take many forms one of which is shown in FIG. 1, where computing or data processing (information handling) system 100 is configured for storing and/or executing program code. In one embodiment, information handling system 100 may include at least one processor 102, which may be or be part of a controller, coupled directly or indirectly to memory devices and input/output devices through a system bus 106, as shown in FIG. 1. Computing system 100 in FIG. 1 is shown with a processor 102 (also referred to a central processing unit (CPU) or microprocessor), Random Access Memory (RAM) 103, nonvolatile memory 104, device specific circuits 101, and I/O interface 105. Alternatively, or additionally, the RAM 103 and/or nonvolatile memory 104 may be contained in the processor 102 as could the device specific circuits 101 and I/O interface 105. The processor 102 may comprise, for example, an off-the-shelf microprocessor, custom processor, Field Programmable Gate Array (FPGA), Application Specific Integrated Circuit (ASIC), discrete logic, etc., or generally any device for executing instructions. The RAM 103 is typically used to hold variable data, stack data, executable instructions, etc., and may include Dynamic Random Access Memory or DRAM.

According to various approaches, the nonvolatile memory 104 may comprise any type of nonvolatile memory such as, but not limited to, Electrically Erasable Programmable Read Only Memory (EEPROM), flash Programmable Read Only Memory (PROM), battery backup RAM, hard disk drives, etc. The nonvolatile memory 104 is typically used to hold the executable firmware and any nonvolatile data containing programming instructions that can be executed to cause the processor 102 to perform certain functions.

In some embodiments, the I/O interface 105 may include a communication interface that allows the processor 102 to communicate with devices external to the controller. Examples of the communication interface may comprise, but are not limited to, serial interfaces such as RS-232, USB (Universal Serial Bus), Small Computer Systems Interface (SCSI), RS-422 or a wireless communication interface such as Wi-Fi, Bluetooth, near-field communication (NFC) or other wireless interfaces. The computing system 100 may communicate with an external device via the communication interface 105 in any communication protocol such as Automation Drive Interface (ADI).

Figure 2:
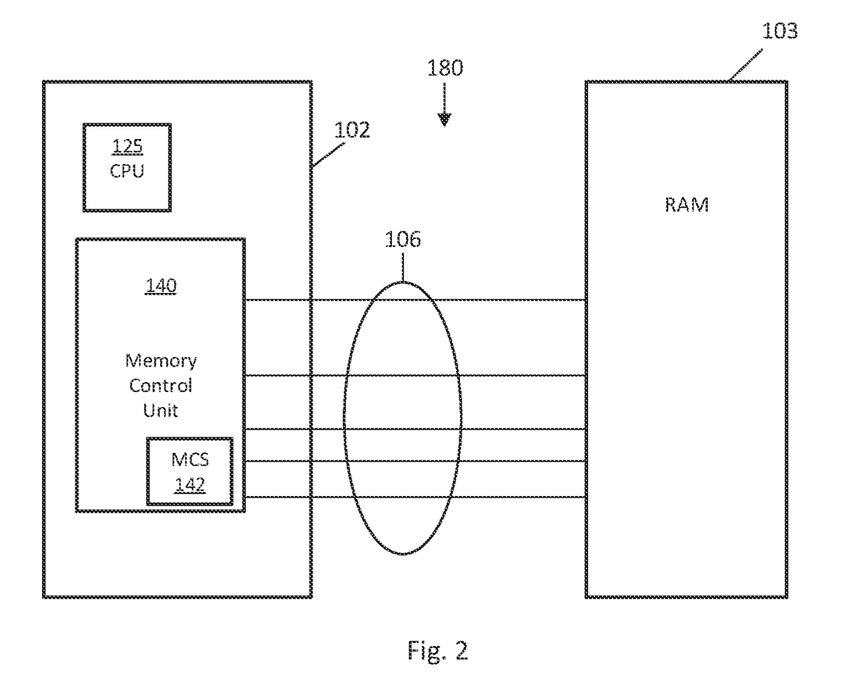
FIG. 2 depicts a processor and memory system according to an embodiment of the present disclosure.

FIG. 2 depicts an exemplary processing system 180 in which the present disclosure can be practiced that may be part of a larger computer system structure or network. The processing system 180 includes a control processor system or processor 102, which is a processing subsystem that includes at least one processor unit (CPU) 125 that may be configured to interface with a Memory Control Unit (MCU) 140. The CPU 125, also referred to as a micro-processor, may be a module that processes read, write, and configuration requests from a system controller (not depicted). The CPU 125 may be a multi-core processor. The MCU 140 may include a memory controller synchronous (MCS) 142, also referred to as a memory controller, that controls communication with one or more memory devices, e.g., DRAMs, (not shown in FIG. 2) in a memory subsystem 103. The MCU 140 and the MCS 142 may include one or more processing circuits, or processing may be performed by or in conjunction with the processor 125. The control processor system 102 communicates with the memory subsystem 103 through a communications bus 106.

Figure 3:
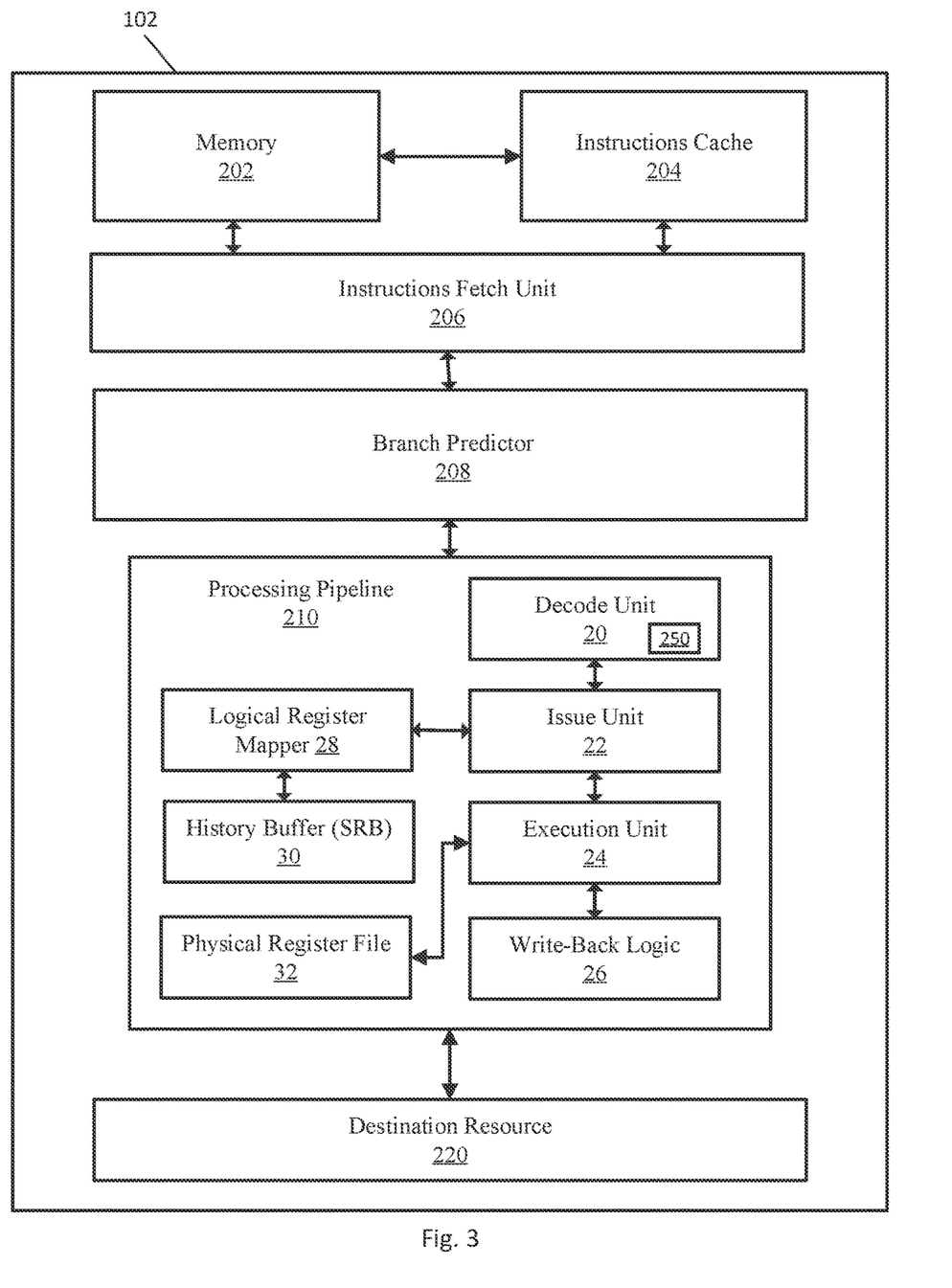
FIG. 3 depicts a block diagram of a processor in accordance with an embodiment of the present disclosure.

FIG. 3 depicts a block diagram of a processor 102 according to an embodiment in which the present disclosure can be practiced. The processor 102 may be a pipelined processor configured to execute one or more streams of instructions or threads. A thread (also referred to as an instruction stream) comprises a sequence or collection of instructions that together perform a specific task. The threads may be instruction streams from different parts of the same program executing on the processor, or may be from different programs executing on the processor, or combinations thereof. The processor in one embodiment may be a multithreaded processor and may process threads concurrently.

The processor 102, according to one embodiment, may include memory 202, an instruction cache 204, an instruction fetch unit 206, a branch predictor 208, a processing pipeline 210, and Destination Resource 220. The processor 102 may be included within a computer processor or otherwise distributed within a computer system. Instructions and data can be stored in memory 202, and the instruction cache 204 may access instructions in memory 202 and store the instructions, e.g., the instructions of the various threads, to be fetched in cache memory 204. Memory 202 may include any type of volatile or nonvolatile memory, such as cache memory. Memory 202 and instruction cache 204 can include multiple cache levels. A data cache (not depicted) may also be included in the processor 102. The processor 102 preferably permits multiple threads to share the functional units of the processor 102 (e.g., instruction fetch and decode units, caches, branch prediction units, and execution units) preferably in concurrent fashion.

In FIG. 3, a simplified example of the instruction fetch unit 206 and the processing pipeline 210 are depicted. In various embodiments, the processor 102 may include one or more processing pipelines 210 and instruction fetch units 206. In an embodiment, the processing pipeline 210 includes a decode unit 20, an issue unit 22, an execution unit 24, write-back logic 26, a logical register mapper 28, a history buffer, e.g., Save & Restore Buffer (SRB) 30, and a physical register file 32. The instruction fetch unit 206 and/or the branch predictor 208 may also be part of the processing pipeline 210. The processing pipeline 210 may also include other features, such as error checking and handling logic, one or more parallel paths through the processing pipeline 210, and other features now or hereafter known in the art. The pipeline may also be broken down and illustrated differently. While a forward path through the processor 102 is depicted in FIG. 3, other feedback and signaling paths may be included between elements of the processor 102. The processor 102 may include other circuits, functional units, and components.

The instruction fetch unit 206 fetches instructions from the instruction cache 204 for further processing by the decode unit 20. The decode unit 20 decodes instructions and passes the decoded instructions, portions of instructions, or other decoded data to the issue unit 22. The decode unit 20 may also detect branch instructions which were not predicted by branch predictor 208. The decode unit 20 may include one or more configuration registers 250 discussed in more detail below. The issue unit 22 analyzes the instructions or other data and transmits the decoded instructions, portions of instructions, or other data to one or more execution units 24 in the pipeline 210 based on the analysis. The execution unit 24 performs and executes operations specified by the instructions issued to the execution unit 24. The execution unit 24 may include a plurality of execution units, such as fixed-point execution units, floating-point execution units, load/store execution units, vector scalar execution units, and/or other execution units. The physical register file 32 holds data for the execution units 24. The logical register mapper 28 contains entries which provide a mapping between a logical register entry (Leg) and an entry in the physical register file 32. When an instruction wants to read a logical register entry (Leg), the logical register mapper 28 informs the issue unit 22, which informs the execution unit 24 where the data in the physical register file 32 can be located.

When a mispredicted branch instruction or other exception is detected, instructions and data subsequent to the mispredicted branch or exception are discarded, e.g., flushed from the various units of processor 110. A history buffer, e.g., Save & Restore Buffer (SRB) 30, contains both speculative and architected register states and backs up the logical register file data when a new instruction is dispatched. In this regard, the history buffer 30 stores information from the logical register mapper 28 when a new instruction evicts data from the logical register mapper 28 in case the new instruction is flushed and the old data needs to be recovered. The history buffer (SRB) 30 keeps the stored information until the new instruction completes. The history buffer (SRB) 30 interfaces with the logical register mapper 28 in order to restore the contents of logical register entries from the history buffer (SRB) 30 to the logical register mapper 28, updating the pointers in the logical register mapper 28 so instructions know where to obtain the correct data, e.g., the processor is returned to the state that existed before the interruptible instruction, e.g., the branch instruction was mispredicted.

The write-back logic 26 writes results of executed instructions back to a destination resource 220. The destination resource 220 may be any type of resource, including registers, cache memory, other memory, I/O circuitry to communicate with other devices, other processing circuits, or any other type of destination for executed instructions or data. One or more of the processor pipeline units may also provide information regarding the execution of conditional branch instructions to the branch predictor 208.

Instructions may be processed in the processor 102 in a sequence of logical, pipelined stages. However, it should be understood that the functions of these stages may be merged together so that this particular division of stages should not be taken as a limitation, unless such a limitation is clearly indicated in the claims herein. Indeed, some of the stages are indicated as a single logic unit in FIG. 3 for the sake of simplicity of understanding, and further details as relevant will be provided below.

In certain aspects, a processor 102 may have multiple execution/processing slices with each slice having one or more of the units shown in FIG. 3. For example, each processing slice may have its own processing pipeline 210 with functional/execution units 24. A processor 102 having multiple processing slices may be capable of executing multiple instructions simultaneously, for example, one instruction in each processing slice simultaneously in one processing cycle. Such a processor having multiple processing slices may be referred to as a multi-slice processor or a parallel-slice processor. Simultaneous processing in multiple slices may considerably increase processing speed. In single-thread (ST) mode a single thread is processed, and in SMT mode multiple threads are processed, e.g., in one or more embodiments two threads (SMT2) or four threads (SMT4) are simultaneously processed.

Information handling and data processing systems, computer systems, processors, and/or digital logic systems can include processor features and/or performance improvements that optimize processor performance but which can also decrease the security of the processor by making it more vulnerable to attack, for example, by a side channel attack. Under some circumstances it may be preferable for the processor to operate at the higher performance level, e.g., performance mode, and in other circumstances it may be preferable for the processor to operate at a higher security level, e.g., secure mode, rather than in the performance mode. It would be preferable and beneficial if the mode under which the processor operates could be dynamically controlled so that the processor can switch between various performance or security modes during processor operation rather than having the performance or security mode in the processor fixed and set at boot time by the firmware.

In addition, it would be beneficial if the different performance/security mode of operation could be set and configured for different control aspects of different privilege levels set within a processor. It would be advantageous if the different secure/performance mode of operation could be dynamically set and changed for different control aspects of different privilege levels or states during operation of the processor, e.g., so that a reboot is not required. It would further be advantageous if different security configurations could be enforced at large granularity, such as for example a hypervisor could desire a certain secure configuration or mode for an entire logical partition. It would be beneficial and advantageous if the system or mechanism for dynamic control would permit enforcement of a secure configuration or mode of processor operation irrespective of the dynamic control desired at a lower privilege level.

In an embodiment, dynamic control of the security/performance mode for each control aspect of processor is provided. In one or more embodiments, different security/performance modes of processor operation can be established for each privilege level (also referred to as a privilege state) of a processor. In an embodiment, dynamic control of the secure/performance mode for each control aspect and/or each privilege level is achieved through software. In a further embodiment, higher privilege levels/states can enforce and/or lock down favorable or desirable security/performance mode settings for lower privilege levels. For example, the secure mode of a higher privilege level in the processor can be enforced against all lower privilege levels or states. The system and technique for dynamic control of the security/performance mode of various privilege states in an embodiment also permits each privilege state or level to know the performance/security mode for each control aspect in its privilege level, and the ability to control the performance/security mode for each control aspect of each privilege level below it, unless a security mode is being enforced by a higher privilege level or state.

In one or more embodiments, configuration registers can be used to provide dynamic control of a processor and more specifically dynamic control of a performance or secure mode of operation of a processor. Computing systems, processors, and digital logic systems often includes registers that may be read or written from software programs. Modern integrated circuit-based registers are usually implemented using static random access memory (SRAM) with multiple ports. Registers generally have dedicated read and write ports. Registers can be user-accessible registers, such as, for example, data registers, address registers, general purpose registers, status registers, and configuration registers. In an aspect, a register is a real or virtual data storage location that in an embodiment has an address in the memory map. In an example, a register file can be an array of processor registers in a processor (CPU). Some of these registers, or portions of the registers, e.g., register entries, are configuration registers. The configuration registers that are utilized to provide dynamic control of the mode of operation of the processor, e.g., secure or performance mode, are typically located in the processor and in one or more embodiments are located in the decode unit of a processor, although the configuration registers can be located in other locations.

In one or more embodiments, for each aspect, for each privilege level, in a processor, the performance/security mode setting can be dynamically controlled and changed, preferably by software, during operation of the processor. For each processor aspect of each privilege level or state in a processor, except the lowest privilege level, there is provided in an embodiment two fields of entries in a configuration register (or two configuration registers) used to define and control the security/performance mode of that aspect. One of the configuration register fields (or configuration registers) is called a Privilege State register (PRVS) and corresponds to and controls the privilege mode for each aspect of that privilege level. The other of the configuration register fields (or configuration registers) is called an Enforce Below register (ENFB) that provides for each control aspect the security/performance mode that particular privilege level in an embodiment wants to enforce against privilege levels lower than that particular privilege level. The fields or entries to the ENFB configuration register, in one or more embodiments, are only writeable from that privilege state or level, or a higher privilege state or level, while the fields or entries to the ENFB configuration register are readable from all privilege levels. The final control of the performance/security mode for each control aspect of each privilege level, in an embodiment, is the OR value of the bit for that control aspect in the PRVS entry for that privilege level and the ENFB bits for the corresponding control aspect in all the privilege levels above the privilege level that is being controlled.

Figure 4:
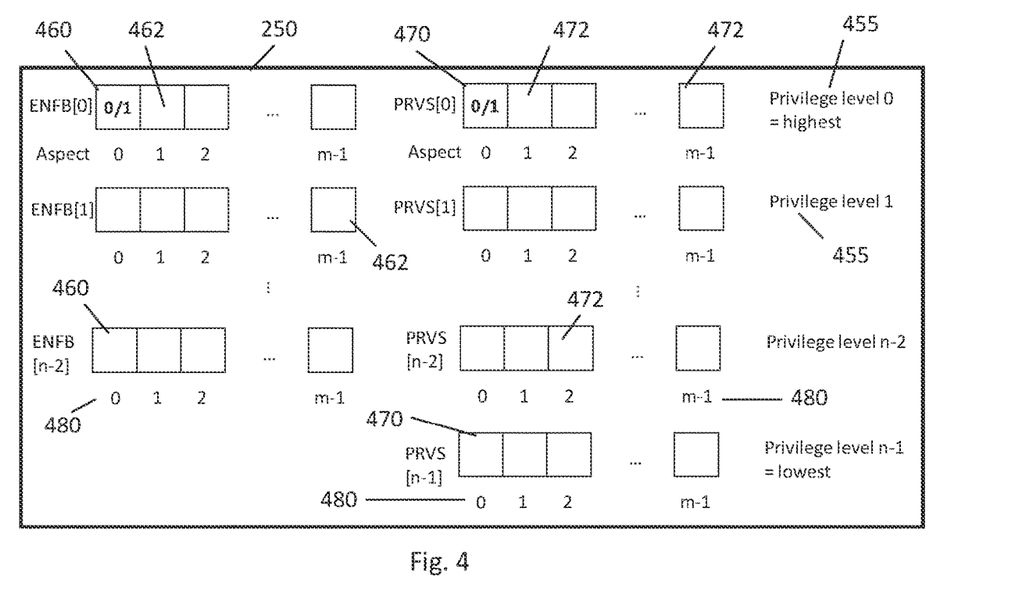
FIG. 4 depicts a diagrammatic illustration of the organization of a configuration register in accordance with an embodiment of the present disclosure.

Dynamic control of the mode of operation, e.g., security mode or performance mode, of a processor, will now be described for an embodiment with reference to FIG. 4, which is a block diagram of configuration register 250. While the configuration register 250 is illustrated as a single configuration register it can be appreciated that the configuration register can be a series of separate configuration registers and that FIG. 4 is only an example embodiment for illustration purposes. The configuration register 250 is configured to have a number of privilege levels or states 455, corresponding to the number of privilege levels utilized by the processor. If the processor has "n" privilege levels or states, then the configuration register 250 typically has a matching number "n" privilege levels or states 455. In the example of FIG. 4, the configuration register has "n" privilege levels 455 illustrated as privilege level 0 through "n-1", where privilege level 0 is the highest privilege level and privilege level "n-1" is the lowest privilege [and configuration file 250 can vary. In one or more embodiments, each privilege level 455 of the processor and/or configuration file 250 has "m" aspects 480 of performance/security mode that can be controlled. In FIG. 4, the configuration register 250 has "m" control aspects 480 illustrated as control aspects 0 through "m-1".

In an embodiment, each privilege level 455, except the lowest privilege level 455[n-1], has two fields of entries, an Enforce Below field 460 (also referred to as ENFB, ENFB field, or ENFB register) and a Privilege Entry field 470 (also referred to as PRVS, PRVS field, or PRVS register). Each PRVS field 470 provides control information for the security/performance mode for that particular privilege level 455[k], where [k] represents the privilege level 455. Each PRVS field 470 has one or more entries 472 to holds control bits for each control aspect 480[j] of the processor that can be controlled or changed, where [j] represents the particular control aspect 480. In one or more embodiments, each ENFB field 460 has one or more entries 462 to hold control bits for each control aspect 480[j] that provides the security/performance mode that the current privilege level 455[k] wants to enforce on all privilege levels 455 below the current level (e.g., privilege level 455[k-1], etc.). For each privilege level 455, each ENFB field 460 and PRVS field 470 in the configuration register 250 has, in an embodiment, a one bit entry 462 or 472 for each control aspect 480[0] through 480[m-1] of the processor, and the number of aspects 480, and hence the number of ENFB entries 462 and PRVS entries 272 in each respective ENFB field 460 and PRVS field 470 is the same. A "1" in each entry 462 and 472 in each of ENFB 460 and PRVS 470 for each control aspect 480 indicates that a security mode for that aspect 480 is set or configured, while a "0" indicates that the performance mode for that aspect 480 is set or configured. The control aspects 480[0] through 480[n-1] in ENVB field 460 correspond to the same aspects 480[0] through 480[n-1] in the PRVS field 470.

The lowest privilege level 455, e.g., privilege level (n-1), in an embodiment, only has the PRVS field 470 for each control aspect 480, and in an embodiment may forego both the ENFB field 460 and the PRVS field 470. If there are "n" privilege levels or states 455 and "m" security/performance control aspects 480 in a processor, than in an embodiment there are a total of at most 2(n-1)m+m or m(2n-1) field entries and a minimum of 2m(n-1) field entries in the configuration register. FIG. 4 shows the configuration register 250 setup in an embodiment where there are "n" privilege levels 0 through n-1 and "m" security/performance control aspects 0 through m-1. There could be a plurality of configuration registers used and formatted in a variety of ways. For example, for each privilege level there could be a separate ENFB register, and/or a separate configuration PSRV register, or as an alternative, each privilege level could have one register where each register has two fields, an ENFB register field and a PSRV register field.

Terminology to identify the different bit values in the ENFB field 460 and the PRVS field 470 for the control/configuration register 250 can be described by ENFB[k][j] PRVS[k][j] where the privilege level is identified by [k] and the security/performance control aspect is identified by [j]. Logic provides one or more access and control rules which define the behavior of the control/configuration register 250 and the processor. In one or more embodiments, control aspect bits [j] can be written for ENFB 460 and PRVS 470 at any time during processor operation and typically does not require a system reboot. For example, the control aspect bits j for each of ENFB 460 and PRVS 470 can be written when execution of an application commences. The control aspect bits for ENFB 460 and PRVS 470 can also be written at other times, including at system reboot, periodic intervals, predetermined times, or at any other time.

While the control aspect bits [j] for ENFB 460 and PRVS 470 in one or more aspects can be programmable and can be configured to be written at various times (and not require a system reboot), the writing of the control aspect bits [j] for ENFB 460 and ENFB 470 can be written according to one or more rules. That is setting the performance/security mode for the control aspect bits [j] in ENFB 460 and PRVS 470, in one or more embodiments, is governed by one or more control rules. In an embodiment, for ENFB[k] 460 at privilege level k, all control aspect bits [j] of ENFB[k][j] are writable by privilege level [k] and any higher privilege level, and for PRVS 470 at privilege level [k], all control aspect bits [j] of PRVS[k][j] are writable by privilege level [k] and any higher privilege level. That is, in an embodiment, a lower privilege level [k] cannot write the control aspect bits [j] for ENFB 460 for a higher privilege level [k-1], and a lower privilege level [k] cannot write the control aspect bits [j] for PRVS 470 for a higher privilege level [k-1].

During operation of processor 102 or computing system 100, the control aspect bits [j] for the ENFB 460 and PRVS 470 can in one or more embodiments be read at various times, programmable times, or at predetermined times during operation of the processor, and reading the configuration register 250 does not require a reboot. In one or more embodiments, the configuration register is read multiple times during processing, and in an embodiment at the start of an application. While the control aspect bits [j] can be read at multiple different times, the ability to read different privilege levels of the ENFB 460 and PRVS 470 is controlled in one or more embodiments by a set of access rules. In one or more embodiments, all control aspect bits [j] of ENFB[k] 460 are readable by any privilege level 455[0] through 455[n-1], and in an alternative embodiment all control aspect bits of ENFB 460 are readable by any, and all, lower privilege levels. All control aspect bits [j] of PRVS 470 are only readable by the current privilege level [k] and any higher privilege level.

In one or more embodiments, the processor is going to write ENFB[k][j] in ENFB 460 for any privilege level [k] when it is trying to control the behavior, e.g., the security/performance mode of operation, of the processor regarding control aspect [j] to any privilege level below it. If a "1" or high bit is written to ENFB[k][j], then the processor enforces (operates in) the secure mode of behavior for aspect [j] for all privilege levels below privilege level k (e.g., privilege levels 455[k-1], 455[k-2], etc.); and if a "0" or low bit is written to ENFB[k][j], then the processor relinquishes privilege level k's control over the behavior, e.g., the secure/performance mode, of control aspect 480 [j] on any privilege level below level [k]. In one or more embodiments, the processor is going to write PRVS[k][j] in PRVS 470 for any privilege level k when it is trying to control its own level's, e.g., privilege level k's, behavior (security/performance mode of operation). If a "1" or high bit is written to PRVS[k][j], then the processor enforces secure mode of operation on its own privilege level, e.g., on privilege level k; and if a "0" or low bit is written to PRVS[k][j], then the processor enforces its own performance mode for its privilege level k, provided no higher privilege level [k] is enforcing the secure mode.

The control value for privilege level [k] and aspect [j] can be expressed in an embodiment as PRVS[k][j] or ENFB[k-1][j] or ENFB[k-2][j] or ... or ENFB[0][j]. Any privilege level above k can enforce a value 1=secure mode via ENFB[k-1][j] through ENFB[0][j]. If the mode of operation, e.g., secure mode, is not enforced by any privilege level above privilege level [k], then the secure/performance mode can be set/chosen by either privilege level k or higher privilege level by setting the PRVS[k][j] bit for aspect [j].

Figure 5:
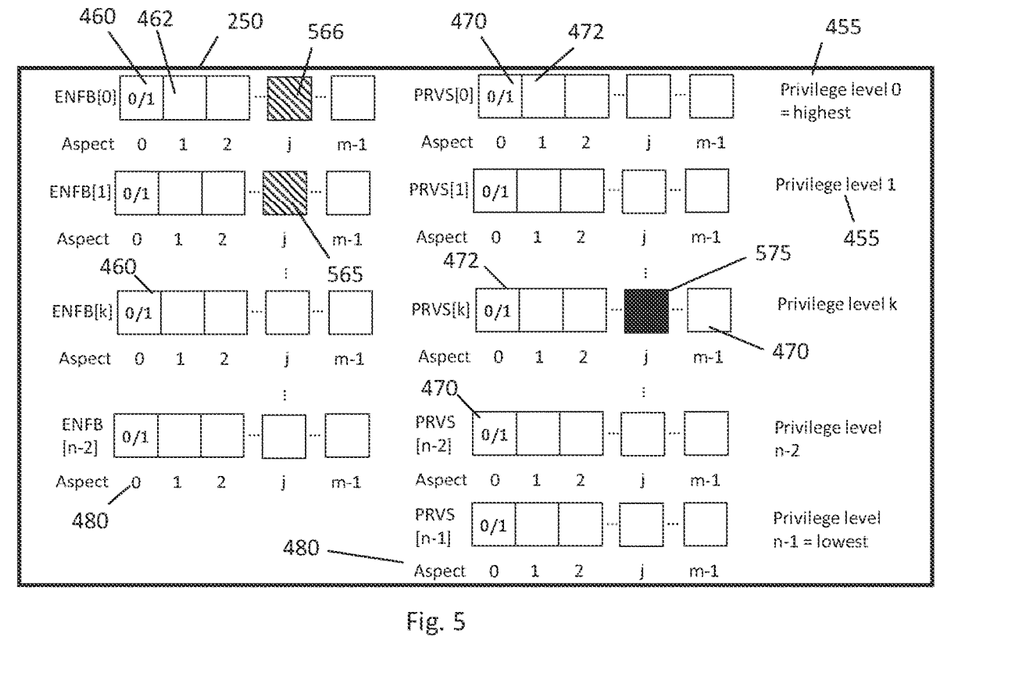
FIG. 5 depicts a diagrammatic illustration of the operation of the configuration register of FIG. 4 in accordance with an embodiment of the present disclosure.

FIG. 5 Illustrates an example of a control register according to an embodiment where an example of applying the control rules is utilized to determine the secure mode or performance mode for control aspect [j] for privilege level [k]. In the example of FIG. 5, the control of aspect [j] for privilege level [k] is determined by the value in PRVS [k][j] (the black box 575 in PRVS 470) or ENFB[k-1][j] (not shown) or ... or ENFB[1][j] (striped box 565 in ENRB 460) or ENB [0] [j] (striped box 566 in ENRB 460). Accordingly, the control of performance or secure mode for control aspect [j] for privilege level [k], can be represented as PRVS[k][j] or ENRB[(k-1)][j] through ENRB[0][j].

Figure 6:
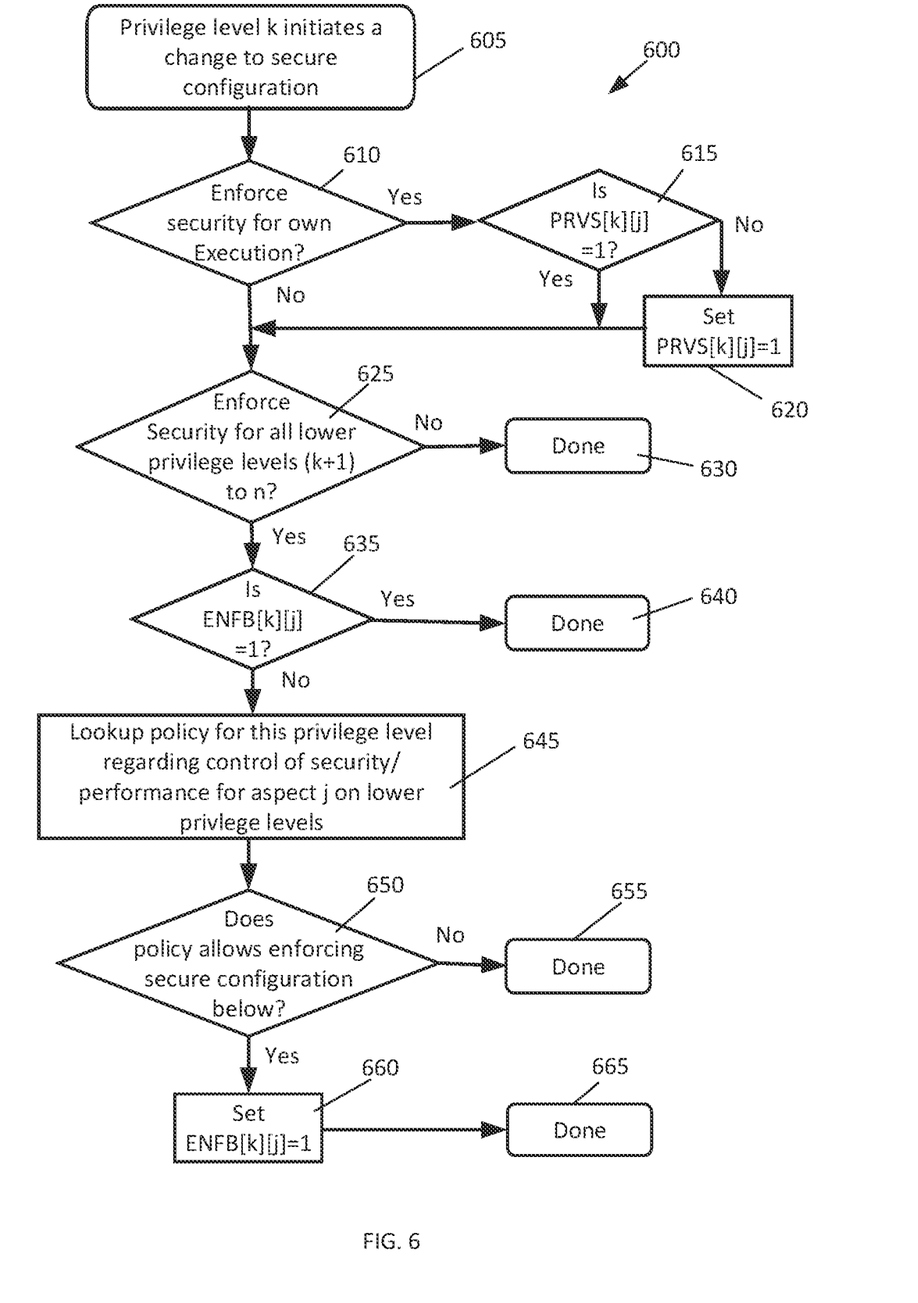
FIG. 6 depicts a flow chart of a method, according to an embodiment, of changing a mode of operation of a processor.

FIG. 6 is exemplary flowchart in accordance with an embodiment illustrating and describing a computer-executed method, and more specifically a method of dynamically controlling the mode of operation of a processor, and in particular dynamically controlling whether a processor operates and executes instructions in a more secure mode or more performance oriented mode. While the method 600 is described for the sake of convenience and not with an intent of limiting the disclosure as comprising a series and/or a number of steps, it is to be understood that the process 600 does not need to be performed as a series of steps and/or the steps do not need to be performed in the order shown and described with respect to FIG. 6, but the process may be integrated and/or one or more steps may be performed together, simultaneously, or the steps may be performed in the order disclosed or in an alternate order.

In one or more embodiments, when an application is called, usually all bits in all the entries in both the ENFB and SRVS registers initialize to a performance mode everywhere, e.g., the bits in the ENVB and PRVS fields/registers for every control aspect (control aspect 480[0] through 480[m]) in every privilege level (privilege level 455[0] through 455[n]) is set to "0". At some point, a secure mode or secure configuration is warranted, desired, called for, or required for a privilege level [k], or a control aspect [j] in a privilege level [k], during operations in the processor, e.g., during execution of the application. FIG. 6 illustrates an embodiment of a method 600 of changing, preferably dynamically changing without an application or system reboot, the performance configuration of privilege level [k] in a processor to a secure mode, and in a further embodiment the performance configuration of a control aspect [j] in privilege level [k] in a processor to a secure mode. It should be appreciated that method 600 of changing to a secure mode can occur on an entire privilege level basis, e.g., privilege level by privilege level, or more granularly on a single control aspect basis in a privilege level, e.g., on a control aspect by control aspect basis within a certain privilege level. Method 600 will be described for changing from a performance mode to a secure mode on a control aspect basis within a privilege level. It can be appreciated that the process can also be performed on a privilege level basis as well.

At 605, privilege level [k] initiates a change to its secure mode of operation. At 610 it is determined whether secure mode should be enforced for control aspect [j] for that privilege level [k]. If control aspect [j] in privilege level [k] should be enforced (610: Yes), then the process proceeds to 615 where it is checked whether the bit field for control aspect [j] in privilege [k] is set to "1"? In other words, is PRVS[k][j]=1? If the control aspect [j] in privilege level [k] is not set to "1" (615: No; PRVS[k][j]=0), then at 620 the control aspect entry [j] in privilege level [k] in the PRVS register is set (written) to "1", e.g., set PRVS[k][j]=1, and the process proceeds to 625. If the control aspect [j] in privilege level [k] is set to "1" (615: Yes; PRVS[k][j]=1), then the process skips 620 and proceeds to 625.

At 625, it is determined whether to enforce secure mode for control aspect [j] for all privilege levels lower than privilege level [k]. That is, it is determined whether to enforce secure mode for control aspect [j] for all lower privilege levels [k+1] to [n], where "n" is the lowest privilege level. If secure mode for control aspect [j] is not to be enforced at any lower privilege levels (625: No), then the process 600 is done as illustrated at 630. On the other hand, if it is determined that secure mode is to be enforced for control aspect [j] on lower privilege levels (625: Yes), then the process continues to 635 where it is determined whether the control aspect [j] in privilege level [k] of the ENFB register is a "1". In other words, if 625 is a yes, and secure mode needs to be enforced for lower privilege levels, then at 635 it is determined whether ENFB[k][j] is set to or equals "1". If the control aspect [j] for the lower privilege levels in the ENFB register field is set to "1" (635: Yes), i.e., ENFB[k][j]=1, then the process 600 is done as illustrated at 640. If it is determined that the control aspect [j] in the lower privilege levels is not set to "1" (635: No), e.g., ENFB[k][j]=0, then the process 600 proceeds to 645.

At 645 the policy regarding control of the security/performance mode for privilege level [k] is looked up for control aspect [j] on privilege levels lower than privilege level [k]. At 650 it is determined whether the policy for control aspect [j] on privilege level [k] allows enforcing the secure configuration for aspect [j] on lower privilege levels. If it is determined at 650 that the policy does not permit enforcing the secure configuration on lower privilege levels, e.g., privilege levels lower than privilege level [k], for control aspect [j] (650: No), then the process is done as illustrated at 655. If the policy does permit enforcing the secure mode or configuration on lower privilege levels for control aspect [j] (650: Yes), then the process continues to 660 where control aspect [j] in privilege [k] in the EFNB register is set to "1". In other words, at 660 ENFB[k][j] is set to "1", ENFB[k][j]=1. The process for changing the control aspect [j] in privilege level [k] is then complete as illustrated at 665.

Figure 7:
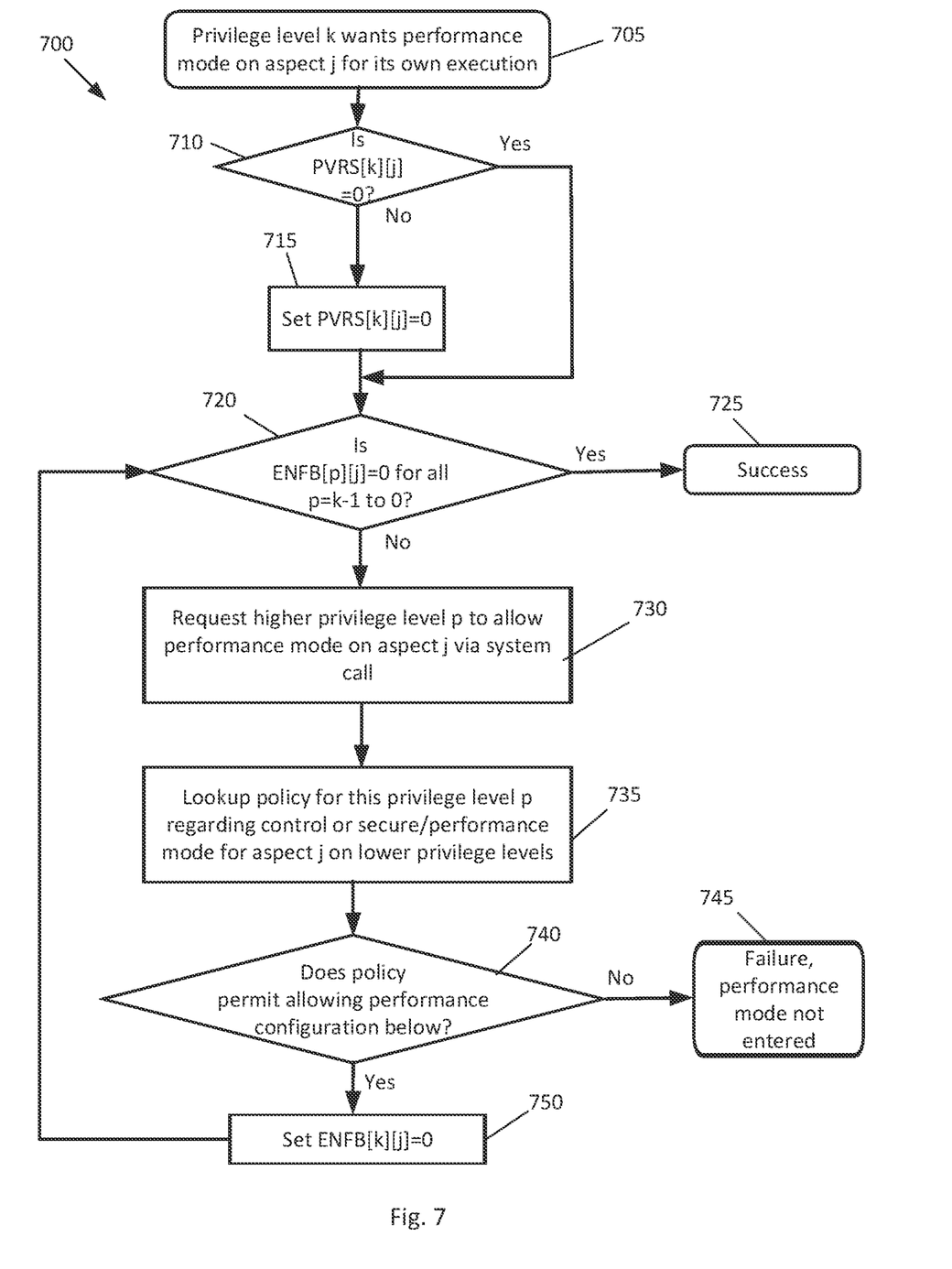
FIG. 7 depicts a flow chart of a method, according to another embodiment, of changing a mode of operation of a processor.

At some point, a performance mode (performance configuration) is warranted, desired, called for, or required in the processor for a privilege level [k], or a control aspect [j] in a privilege level [k], e.g., during execution of a software application. For example, a processor could be operating in a secure mode for one or more privilege levels [k], and/or one or more control aspects [j] in a privilege level [k], and running a software application and the software application could desire and/or trigger for the processor to operate in a performance mode because the environment could warrant a secure mode of operation and it may be beneficial or advantageous to operate in a secure mode. FIG. 7 illustrates an embodiment of a method 700 of undergoing a process to change, preferably dynamically change without an application or system reboot, a secure mode in a processor at privilege level [k] to a performance mode, and in a further embodiment a process to change a secure mode of operation in a processor for a control aspect [j] in privilege level [k] to a performance mode. It should be appreciated that method 700 of changing to a performance mode can occur on an entire privilege level basis, e.g., privilege level by privilege level, or more granularly on a single control aspect in a privilege level basis, e.g., on a control aspect by control aspect basis within a certain privilege level. Method 700 will be described for the process of attempting to change from a secure mode to a performance mode on a control aspect basis within a privilege level. In one or more embodiments, the processor cannot change to a secure mode for example when a higher privilege level enforces a secure mode of operation on the control aspect for the lower privilege levels.

At 705, privilege level [k] wants to change to performance mode of operation for aspect [j]. At 710 it is determined whether the PRVS register field for control aspect [j] in privilege level [k] in the PRVS register is set to "0"? In other words, is PRVS[k][j]=0? If the control aspect [j] in privilege level [k] is set to "0" (710: Yes; PRVS[k][j]=0), then the process 700 continues to 720. If at 710 the control aspect entry [j] in privilege level [k] in the PRVS register is not set (written) to "0", (710: No), e.g., PRVS[k][j]=1, then process 700 proceeds to 715. That is, if the control aspect [j] in privilege level [k] is set to "1" (710: No; PRVS[k][j] not=0), then the process 700 proceeds to 715 where the bit in PRVS register field for control aspect [j] in privilege level [k] is set (written) to "1". After 715 the process 700 proceeds to 720.

At 720 it is determined whether or not the ENFB register field for control aspect [j] in all privilege levels above privilege level [k], i.e., all privilege levels [k-1] through privilege level 0, is set to "0"? If it is determined that the ENFB register field for control aspect [j] in every privilege level above privilege level [k] is set to zero (720: Yes; ENFB[p][j]=0 where p=privilege levels (k-1) to 0), then performance mode can be enacted (enabled) for control aspect [j] in privilege level [k]. If the ENFB register field for control aspect [j] for all privilege levels higher than privilege level [k] is not set to "0" (720: No; ENFB[p][j]=1, where p=privilege levels (k-1) to 0), then the process proceeds to 730 where a system call requests permission or checks for each higher privilege level p (where p=privilege levels [k-1] to privilege level 0) whether to allow performance mode for control aspect [j]. In this regard, the process 700 performs 720, 730, 735, 740, 745, and 750 on a privilege level by privilege level basis for each privilege level higher than privilege level [k].

More specifically, at 730, for the privilege level [k-1], the privilege level just above privilege level [k], a system call requests or checks whether for privilege level [k-1] to allow performance mode for control aspect [j]. The process 700 proceeds to 735 where a policy is looked up for privilege level [k-1] to determine control over the secure mode or performance mode of operation for control aspect [j] on lower privilege levels. At 740 it is determined whether the policy for privilege level [k-1] permits the performance mode for control aspect [j] for lower privilege levels. If at 740, the policy for privilege level [k-1] does not permit the performance mode to be used for control aspect [j] for lower privilege levels (740: No), then at 745 performance mode is not permitted for control aspect [j] in privilege level [k]. The processor stays in secure mode of operation for aspect [j] in privilege level [k].

If at 740 it is determined that the policy for privilege level [k-1] for control aspect [j] permits the performance mode to be enabled for lower privilege levels (740: Yes), e.g., for privilege level [k], then at 750 ENFB[k-1][j] is set to "0". The process after 750 proceeds back to 720 where it is determined whether the ENFB register field for control aspect [j] for the next highest privilege level [k-2] is set to "0", and if EFNB field register for control aspect [j] in privilege level [k-2] is not set to zero ("0"), then process 700 repeats steps 730, 735, 740, 745, and 750 for privilege level [k-2], looping back to step 720 for the next highest privilege level until process steps 730 through 750 are performed for all privilege levels [k-1] through privilege level 0 (the highest privilege level). After the highest privilege level is checked (privilege level 0), then at 750 ENFB register field for control aspect [j] in privilege level 0 is set to "0" (ENFB[0][j]=0) and the process loops back to 720 where in step 720 it is determined that ENFB[k][j]=0 and the process proceeds to 725 where the performance mode for aspect [j] in privilege [k] has been enabled.

While the system and process has been described for a design configuration and operation where the secure mode is set with a high bit, i.e., a "1", it can be appreciated that performance mode can be set with a high bit (bit=1) and secure mode can be set with a low bit (bit=0). It can also be appreciated that the processor or calling up a software application can initialize values in the ENFB register field and the PRVS register field to secure mode.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A programming product comprising a machine readable medium storing programming instructions that when executed cause a processor to perform operations comprising:
   initiating a change in configuration of the processor from a performance mode to a secure mode for a control aspect in a privilege level;
   determining whether the bit for the control aspect in the privilege level is set in a Privilege Entry (PRVS) register field to secure mode; and
   setting, if the bit for the control aspect in the privilege level in the PRVS register field is not set to secure mode, the bit for the control aspect in the privilege level in the PRVS register field to secure mode, thereby enabling the secure mode in the processor for the control aspect in the privilege level.

2. The programming product according to claim 1, further comprising programming instructions that when executed cause the processor to perform operations comprising:
   determining whether to enforce secure mode for the control aspect on lower privilege levels; and
   if it is determined not to enforce secure mode for the control aspect on lower privilege levels then the method of changing to the secure mode for the control aspect in the privilege level is complete.

3. The programming product according to claim 2, further comprising programming instructions that when executed cause the processor to perform operations comprising:
   determining, if it is determined to enforce secure mode for the control aspect on the lower privilege levels, whether the bit for the control aspect in the lower privilege levels is set in an Enforce Below (ENFB) register field to secure mode; and
   completing, if it is determined that the bit for the control aspect in the lower privilege levels in the ENFB register field is set to secure mode, the process of changing to the secure mode for the control aspect in the privilege level.

4. The programming product according to claim 3, further comprising programming instructions that when executed cause the processor to perform operations comprising:
determining, if it is determined that the bit for the control aspect in the lower privilege levels in the ENFB register field is not set to secure mode, whether a policy for the control aspect in the privilege level permits enforcing the secure mode for the control aspect on the lower privilege levels; and
completing, if the policy for the control aspect in the privilege level does not permit enforcing the secure mode of the control aspect in the lower privilege levels, the process of changing to a secure mode for the control aspect in the privilege level.

5. The programming product according to claim 4, wherein determining whether a policy for the control aspect in the privilege level permits enforcing the secure mode for the control aspect on lower privilege levels comprises programming instructions that when executed cause the processor to look up the policy for the control aspect in the privilege level regarding enforcement of the secure mode for the control aspect on the lower privilege levels.

6. The programming product according to claim 4, further comprising programming instructions that when executed cause the processor to perform operations comprising:
setting, if the policy for the control aspect in the privilege level permits enforcing the secure mode of the control aspect in the lower privilege levels, the bit in the ENFB register field for the control aspect in the privilege level to secure mode.

7. The programming product according to claim 3, further comprising programming instructions that when executed cause the processor on an application call to initially set the bits in the ENFB register field and the bits in the PRVS register field for the control aspect in the privilege level to the performance mode.

8. The programming product according to claim 3, wherein the ENFB register field and the PRVS register field are located in the processor in a decode unit where the decode unit decodes the instructions for execution by the processor.

9. The programming product according to claim 3, further comprising programming instructions that when executed cause the processor to set the bits in the ENFB register field and the SRVS register field to 1 for a secure mode and set to 0 for a performance mode.

10. The programming product according to claim 1, wherein the secure mode or performance mode of the processor for the control aspect in the privilege level is controlled by a software application.

11. The programming product according to claim 3, further comprising programming instructions that when executed cause the processor to perform operations comprising:
checking, in response to a trigger to change from a secure mode to a performance mode for the control aspect in the privilege level, whether the bit in the PRVS register field for the control aspect in the privilege level is set to the performance mode;
setting, in response to the bit in the PRVS register field for the control aspect in the privilege level not being set to the performance mode, the bit in the service register field for the control aspect in the privilege level to the performance mode;
checking whether the control aspect in the privilege level of the ENFB register field is set to performance mode for all higher privilege levels; and
changing, in response to the control aspect in the privilege level of the ENFB register being set to the performance mode for all higher privilege levels, the processor to the performance mode for the control aspect in the privilege level.

12. The programming product according to claim 11, further comprising programming instructions that when executed cause the processor to perform operations comprising:
requesting, in response to the control aspect in the privilege level of the ENFB register not being set to the performance mode for all higher privilege levels, the higher privilege levels to permit the performance mode for the control aspect in the privilege level; and
not entering, in response to the higher privilege levels not permitting the performance mode for the control aspect in the privilege level, the performance mode for the control aspect in the privilege level.

13. The programing product according to claim 12, wherein requesting the higher privilege levels to permit the performance mode for the control aspect in the privilege level further comprises programming instructions that when executed cause the processor to perform operations comprising:
looking up a policy for the higher privilege levels regarding the performance mode for the control aspect on lower privilege levels;
checking whether the policy permits the performance mode for the control aspect in the privilege level; and
setting, in response to the policy permitting the performance mode for the control aspect in the privilege level, the bit in the ENFB register field for the control aspect in the privilege level to the performance mode thereby permitting the processor to enter the performance mode for the control aspect in the privilege level.

14. The programming product according to claim 13, further comprising programming instructions that when executed cause the processor to perform operations comprising:
looking up a policy for the higher privilege levels regarding the performance mode for the control aspect on lower privilege levels, and checking whether the policy permits the performance mode for the control aspect in the privilege level, on a privilege level by privilege level basis; and
setting, for each higher privilege level where the policy permits the performance mode for the control aspect in that privilege level, the bit in the ENFB register field for the control aspect in that privilege level to the performance mode and thereafter checking whether the bit in the ENFB register field for the control aspect is set to performance mode for all higher privilege levels.

15. A program product comprising a machine readable medium storing programming instructions that when executed cause a processor to perform operations comprising:
checking, in response to a trigger to change from a secure mode to a performance mode of operation for a control aspect in a privilege level, whether a bit in a Privilege Entry (PRVS) register field for the control aspect in the privilege level is set to the performance mode;
setting, in response to the bit in the PRVS register field for the control aspect in the privilege level not being set to the performance mode, the bit in the service register field for the control aspect in the privilege level to the performance mode;

checking whether the control aspect in the privilege level of an Enforce Below (ENFB) register field is set to performance mode for all higher privilege levels; and changing, in response to the control aspect in the privilege level of the ENFB register being set to the performance mode for all higher privilege levels, to the performance mode for the control aspect in the privilege level.

16. The programming product according to claim 15, further comprising programming instructions that when executed cause the processor to perform operations comprising:

requesting, in response to the control aspect in the privilege level of the ENFB register not being set to the performance mode for all higher privilege levels, the higher privilege levels to permit the performance mode for the control aspect in the privilege level;

not entering, in response to the higher privilege levels not permitting the performance mode for the control aspect in the privilege level, the performance mode for the control aspect in the privilege level.

17. The programming product according to claim 16, wherein requesting the higher privilege levels to permit the performance mode for the control aspect in the privilege level further comprises programming instructions that when executed cause the processor to perform operations comprising:

looking up a policy for the higher privilege levels regarding the performance mode for the control aspect on lower privilege levels;

checking whether the policy permits the performance mode for the control aspect in the privilege level; and setting, in response to the policy permitting the performance mode for the control aspect in the privilege level, the bit in the ENFB register field for the control aspect in the privilege level to the performance mode thereby permitting the processor to enter the performance mode for the control aspect in the privilege level.

18. The programming product according to claim 17, further comprising programming instructions that when executed cause the processor to perform operations comprising:

looking up a policy for the higher privilege levels regarding the performance mode for the control aspect on lower privilege levels and checking whether the policy permits the performance mode for the control aspect in the privilege level on a privilege level by privilege level basis;

setting, for each higher privilege level where the policy permits the performance mode for the control aspect in that privilege level, the bit in the ENFB register field for the control aspect in that privilege level to the performance mode; and checking whether the bit in the ENFB register field for the control aspect is set to performance mode for all higher privilege levels.

19. The programming product according to claim 15, further comprising programming instructions that when executed cause the processor to perform operations comprising:

initiating a change in configuration in a processor from a performance mode to a secure mode for a control aspect in a privilege level;

determining whether the bit for the control aspect in the privilege level is set in the PRVS register field to secure mode;

setting, if the bit for the control aspect in the privilege level in the PRVS register field is not set to secure mode, the bit for the control aspect in the privilege level in the PRVS register field to secure mode, thereby enabling the secure mode in the processor for the control aspect in the privilege level;

determining whether to enforce secure mode for the control aspect on lower privilege levels;

determining, if it is determined to enforce secure mode for the control aspect on the lower privilege levels, whether the bit for the control aspect in the lower privilege levels is set in an Enforce Below (ENFB) register field to secure mode; and completing, if it is determined that the bit for the control aspect in the lower privilege levels in the ENFB register field is set to secure mode, the process of changing to the secure mode for the control aspect in the privilege level.

20. A processor comprising:

one or more registers, wherein at least one of the registers is a security configuration register, the security configuration register having a privilege entry (PRVS) register field for each of one or more privilege levels, each PRVS register field for each privilege level having one or more control aspect entries to hold a bit; and an enforce below (ENFB) register field having one or more control aspect entries to hold a bit, the PRVS register field control aspects being equal in number to and corresponding to the ENRB register field control aspects, wherein, the processor is configured to:

initiate a change in configuration in a processor from a performance mode to a secure mode for a control aspect in a privilege level;

determine whether the bit for the control aspect in the privilege level is set in the PRVS register field to secure mode; and setting, if the bit for the control aspect in the privilege level in the PRVS register field is not set to secure mode, the bit for the control aspect in the privilege level in the PRVS register field to secure mode, thereby enabling the secure mode in the processor for the control aspect in the privilege level.

\* \* \* \* \*